(No Model.)
H. YSABA Y LAZARTE & E. P. LARÉE.
HEATER AND EVAPORATOR FOR SIRUP AND OTHER LIQUIDS.
No. 311,799. Patented Feb. 3, 1885.
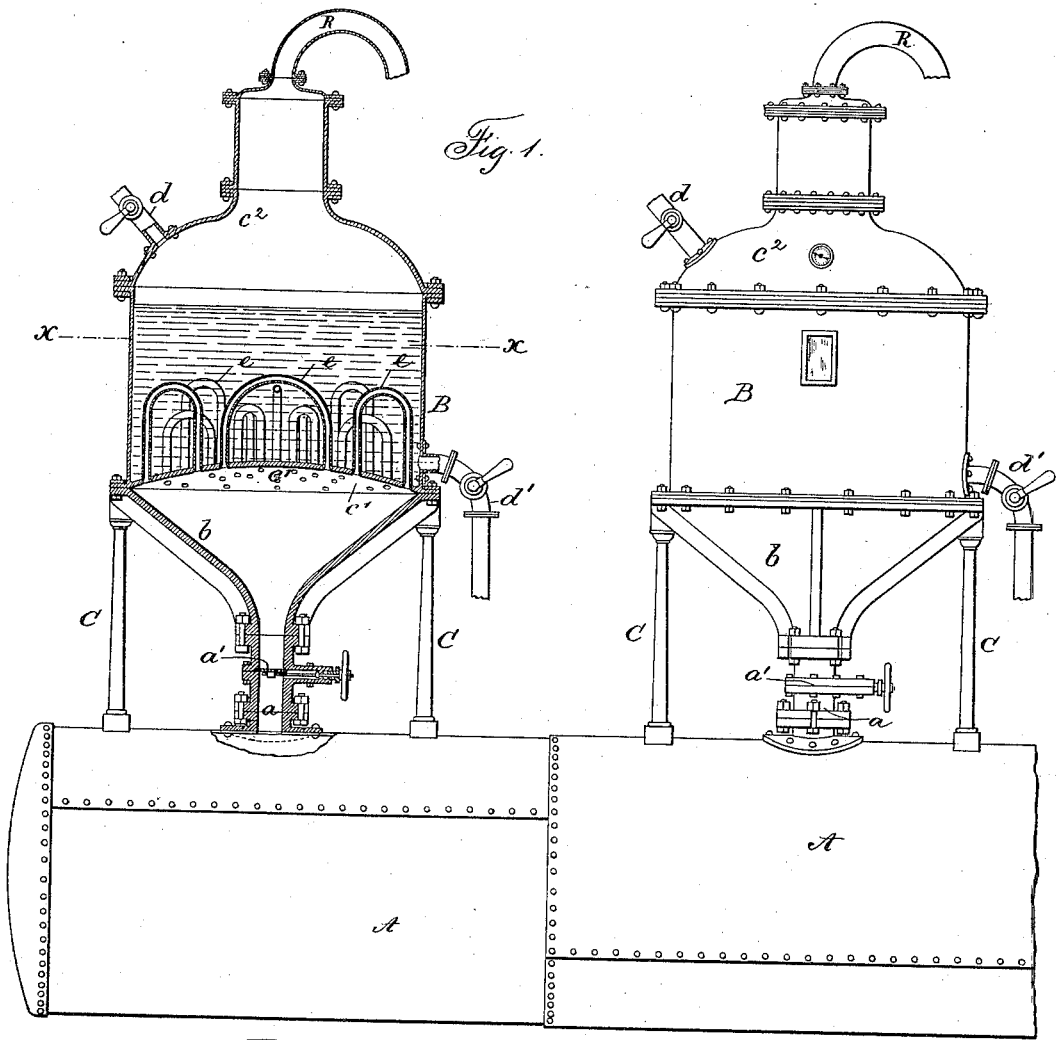
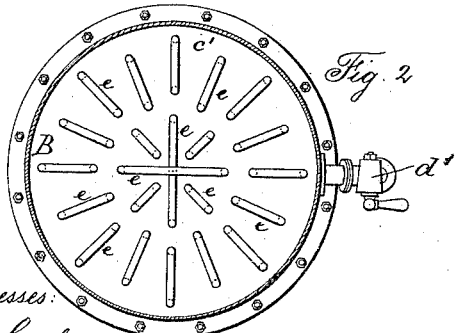
Witnesses:
J. Staib
Harold Serrell
Inventors:
Hilario Ysabay Lazarte
Eugenio Prospero Larée
per Lemuel W. Serrell
atty

UNITED STATES PATENT OFFICE.

HILARIO YSABA Y LAZARTE AND EUGENE PROSPERO LARÉE, OF SANTA CLARA, CUBA.

HEATER AND EVAPORATOR FOR SIRUP AND OTHER LIQUIDS.

SPECIFICATION forming part of Letters Patent No. 311,799, dated February 3, 1885.

Application filed October 16, 1883. Renewed January 3, 1885. (No model.)

*To all whom it may concern:*

Be it known that we, HILARIO YSABA Y LAZARTE and EUGENE PROSPERO LARÉE, of Santa Clara, Cuba, have invented a new and useful Improvement in Heaters and Evaporators for Sirups and other Liquids; and the following is declared to be a full and exact description of the same.

In the process of making sugar from sugar-cane juice, said juice is boiled in vessels containing coils of steam-heating pipes, and known as "defecators," and also in vessels connected together and known as the "double-action" or "triple-action" apparatus. These last-named vessels are subject to the action of steam heat from underneath, and the hot watery vapors from one vessel sometimes pass over into the next, assisting in the boiling of the liquor therein.

The object of our invention is to increase the efficiency of the heating or evaporating pans, and at the same time lessen its cost, and in carrying out our invention we employ a boiling or vacuum pan placed upon the steam-supply boiler and having direct steam connection therewith. The bottom of this boiling-vessel is by preference slightly dome-shaped, and we employ a series of steam-pipes bent into an inverted-U form and inserted into this dome-shaped bottom. These inverted steam-pipes extend over the entire surface of the dome-shaped bottom, and any number of these boiling or vacuum pans may be employed, as they can be filled, operated, and refilled in rotation. In the operation of these pans the sugar-cane juice is run in from the crushing-rollers and the steam turned on at a valve conveniently placed between the pan and the boiler. The steam occupies the space under the dome-shaped bottom, and ascends up into all of the inverted-U-shaped pipes, thereby greatly increasing the heating-surface, and bringing the steam heat into intimate contact with all the particles of sugar-cane juice or other liquid, causing a very thorough heating and ebullition and more perfect boiling operation.

In the drawings, Figure 1 represents a vertical section of one boiling or vacuum pan and elevation of part of the steam-boiler and another vacuum-pan, and Fig. 2 is a cross-section of the same at the line $x$ $x$.

A represents the steam-boiler, which may be of any desired horizontal form; B, the boiling-vessels or vacuum-pans, and C the columns for steadying or partially supporting the same. The lower portion at $a$ of the boiling-vessel is made with a flange corresponding to a flange upon the boiler, and bolts and nuts secure these parts together. This portion is also provided with a suitable valve at $a'$ to open and close the steam-passage to the pan. The portion $b$ of the boiling-vessel is made conical, with strengthening-ribs at the sides and a flanged upper edge, to which the boiling-pan B is bolted and held secure. The boiling-pan B is preferably cylindrical, with a dome-shaped bottom, $c'$, and closed top $c^2$, and pipe $d$, for supplying the sugar-cane juice or other liquid, and there is a pipe, $d'$, and valve for discharging the boiled or concentrated liquid; and R is the pipe to the condenser and air-pump. The inverted-U-shaped pipes $e$ are inserted into the dome-shaped bottom $c'$, preferably in regular series of varying heights—some short and some high. These pipes $e$ are open at their lower ends for a free passage of the steam within the jacket portion $b$. The employment of this form of boiling-pan and pipes $e$ gives a greater heating-surface in the boiling operation, and the cane-juice is more thoroughly and evenly acted on throughout all of its particles, and the boiled cane-juice as it leaves these boiling-pans is, with some kinds of sugar, all ready for crystallization and the action of the centrifugal machines. In some other forms of apparatus for making sugar and molasses it is preferable to carry this boiled cane-juice through the regular "vacuum-pan" and "charcoal-purifiers" before crystallization and the action of the centrifugal machines. By placing this apparatus directly upon the boiler or steam-generator, a saving is effected, because any water of condensation runs back to the boiler in a heated state and little or no water has to be supplied to the boiler.

We claim as our invention—

1. The boiling or vacuum pan herein described, composed of the base $a$ and valve $a'$, the portion $b$, the pan B, its dome-shaped bottom $c'$, and the inverted-U-shaped pipes $e$, substantially as set forth.

2. The combination, with a pan for heating or boiling sirup or other liquid, of the inverted-U-shaped pipes or tubes within the pan, and passing at their ends through the flat or dome-shaped bottom of the pan, for the purposes and substantially as set forth.

3. In an evaporating or boiling apparatus, a pan to contain the material to be evaporated, a jacket below the same, a steam generator or boiler, and a direct connection from the upper part of the boiler to the steam-jacket, so that the steam passes directly into the steam-jacket and water of condensation runs back into the boiler, substantially as set forth.

Signed by us this 16th day of August, A. D. 1883.

HILARIO YSABA Y LAZARTE.
EUGENE PROSPERO LARÉE.

Witnesses:
LUIS A. YEMANDER,
LUIS CASAÑAS.